United States Patent [19]
Marx

[11] Patent Number: 5,437,827
[45] Date of Patent: Aug. 1, 1995

[54] MAKING A HEAT RECOVERABLE ARTICLE

[75] Inventor: Karl-Heinz Marx, Garbsen, Germany

[73] Assignee: Kabelmetal Electro, Hanover, Germany

[21] Appl. No.: 580,837

[22] Filed: Sep. 10, 1990

[30] Foreign Application Priority Data

Sep. 8, 1989 [DE] Germany .......... 39 29 859.0

[51] Int. Cl.⁶ .......................................... B29C 61/08
[52] U.S. Cl. .................................. 264/103; 156/84; 156/86; 156/244.14; 264/173; 264/174; 264/230
[58] Field of Search ............... 264/173, 174, 22, 230, 264/103, 342 R; 156/86, 84, 244.14

[56] References Cited
U.S. PATENT DOCUMENTS

| | | | |
|---|---|---|---|
| 3,253,618 | 5/1966 | Cook | 264/230 |
| 3,253,619 | 5/1966 | Cook et al. | 264/230 |
| 3,448,182 | 6/1969 | Derbyshire et al. | 264/22 |
| 3,526,683 | 9/1970 | Heslop et al. | 264/22 |
| 4,219,522 | 8/1980 | Oyama | 264/173 |
| 4,304,616 | 12/1981 | Richardson | 264/173 |
| 4,631,098 | 12/1986 | Pithouse et al. | 156/86 |
| 4,741,873 | 5/1988 | Fischer et al. | 264/103 |
| 4,836,872 | 6/1989 | Landry et al. | 264/230 |

Primary Examiner—Jeffery Thurlow
Attorney, Agent, or Firm—Ralf H. Siegemund

[57] ABSTRACT

A polymeric tube is extruded; one or more strands are wrapped around the tube, the strands having a polymeric core and a high strength helical fiber cover; a second tube extruded thereon; at least one of the tubes is cross linked; subsequently the composite tube wall is heated, expanded and cooled in the expanded state; the tube may be cut longitudinally before or after the heating/cooling.

13 Claims, 2 Drawing Sheets

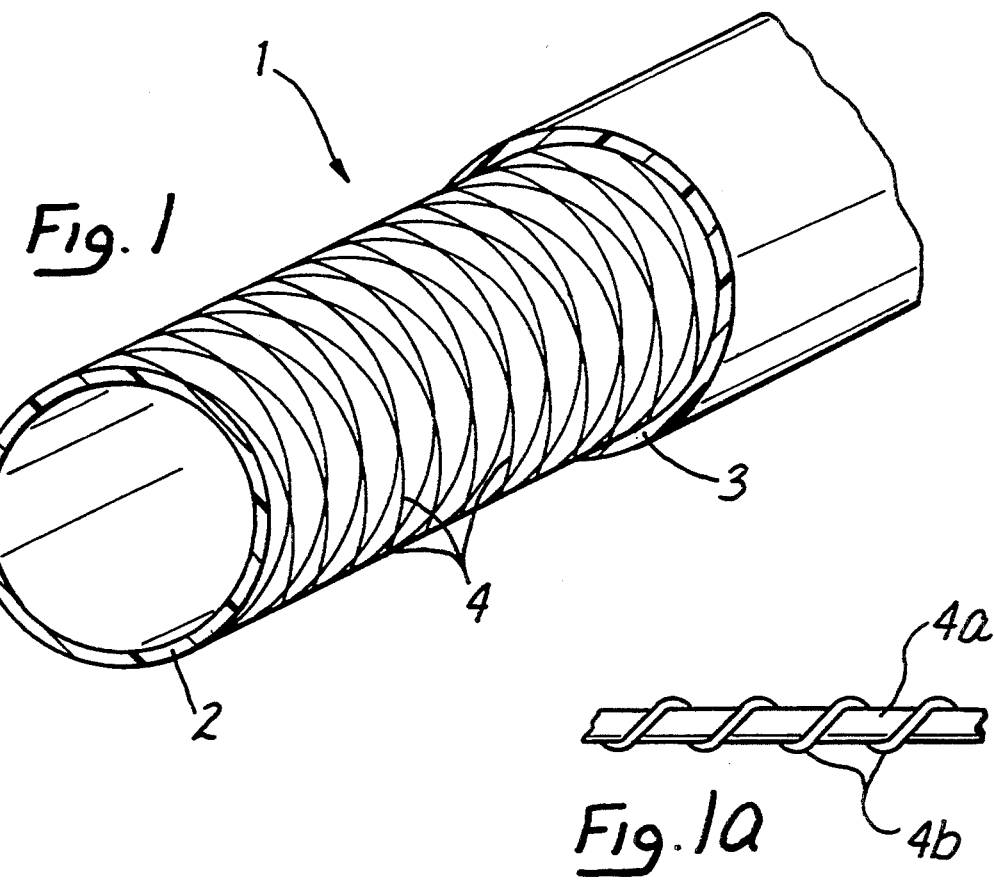
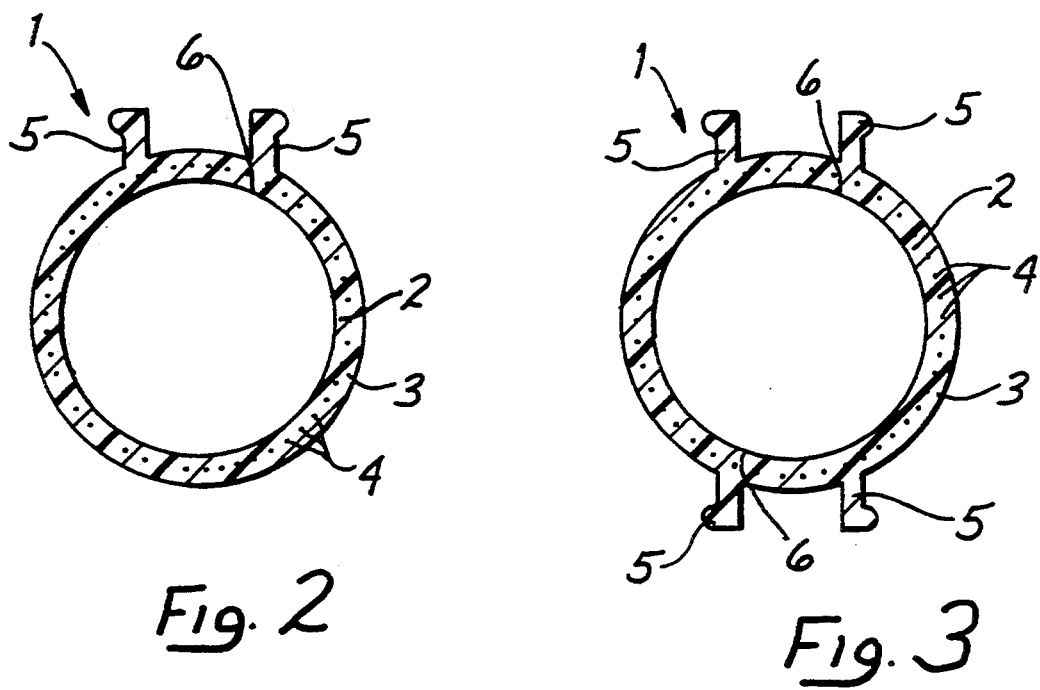

MAKING A HEAT RECOVERABLE ARTICLE

BACKGROUND OF THE INVENTION

The present invention relates to shrink articles and items and a method of making heat recoverable i.e. shrinking, shrunk and shrinkable objects.

Shrink or heat recoverable articles and objects of the kind to which the invention pertains are usually manufactured in that a thermoplastic synthetic material is first shaped in accordance with the (ultimately) desired shape; next, the thermoplastic synthetic material is chemically or physically cross linked whereupon the object thus attained is heated above the crystalline melting point. The hot object is then stretched in the desired direction, and while maintaining the stretched expanded condition, it is cooled. The cooling "freezes" the stretched and extended state as far as the physical configuration is concerned. However as the article is being reheated it returns to i.e. recovers the original dimensions the object had prior to the stretching and extending process.

Articles, items and objects of the kind described above are used for a variety of purposes. One purpose is the covering of joints in electrical cable or tube configuration. In other words the shrink article is used as a covering sleeve for splicing or connecting areas and zones in cable and tubular configurations. It is a drawback here that the strength particularly the tear strength, of such a sleeve is indeed very low when in the extended and stretched state at elevated temperature as well as for the nearly as high recovery temperature, even though "hot plus extended" is just temporary state; still, if there is for some reason a pointed area or a sharp edge or the like and if the article engages such a point edge or the like, there is a great danger of tearing and cutting.

In order to increase the tear strength of these kinds of articles it is known to embed threads, fibers or the like of high strength material in the wall of the shrink article. For example, European patent 115905 (corresponding US case KEG/L982, Ser. No. 379,093, filed Jul. 13, 1989) now U.S. Pat. No. 5,141,812 discloses a heat recoverable fabric made of heat recoverable fibers running on one direction, and transverse thereto and interwoven glass fibers. This fabric, textile, mesh or webbing is embedded in a matrix of synthetic. The danger of tearing is indeed quite reduced in this case but it is a disadvantage that on recovery only the heat recoverable fibers will in fact shrink and will carry the matrix along. The glass fibers on the other hand are effective only transverse to that direction of shrinking.

Another solution to the aforementioned problem is found in an application by me and others, Ser. No. 379,093, filed Jul. 13, 1989 now U.S. Pat. No. 5,141,812. Here is disclosed a fabric or mesh or other woven etc. configuration, made of strands and which are embedded in a synthetic matrix. Each strand is stretchable and is comprised of a central, synthetic, heat recoverable core, surrounded by a strong thread of helical configuration, possibly in a mesh or other pattern spun or threaded around the core. This helical "layer" is made of high strength thread such as glass i.e. it is not heat recoverable.

As the core is stretched the pitch of the helical (e.g. glass fiber) "threading" is increased while simultaneously the inner diameter of the helical configuration is reduced, but so is the outer diameter of the stretched core. Thus, owing to the helical configuration of the initial reenforcing threading one can speak here of an extension reserve which may amount to 400% or even more. In the extreme case of course the helical glass fiber is stretched to almost straight configuration.

The fabric using such strands may be comprised of a plurality of parallelly extending strands which are of the kind described and which are interwoven or pleated with transversely extending glass fibers. On shrinking only the matrix pulls and the cores of the strands, and they shrink in their direction of extension while the glass fibers on the cores and those interwoven transversely to them, are in fact reinforcing the configuration respectively in the direction of shrinking as well as transversely thereto.

DESCRIPTION OF THE INVENTION

It is an object of the present invention to provide a new and improved method for making strips, tapes, sleeves or the like of a fiber reinforced configuration in a more economical fashion without compromising on the desired properties.

It is another object to provide a new and improved method for making shrink articles of different kinds such as tubes with reinforcing insert or the like.

In accordance with the preferred embodiment of the present invention the objects are attained and a new and improved method is proposed under a combination of the following features.

(a) one begins with the extrusion of a polymer material to obtain a tube;

(b) at least one strand of a polymer material is helically wound on the extruded tube, preferably several strands are helically coiled onto the tube or they are braided, resulting in a complex but basically helical pattern of strand material on the polymer tube;

(c) on the layer as per (b) a second tube of a polymer material is extruded;

(d) at least one and possibly both of the extruded tubes are then cross linked under utilization of appropriate cross linking mechanism;

(e) the aforementioned cross linked configuration is then (1) heated to a temperature above the crystalline melting point of at least that tube that is cross linked, is (2) expanded radially in the heated state and cooled (3) while maintaining the expanded state during the cooling process;

(f) optionally, either before or after step (e) the tube may be cut open, to obtain a strip which in either case then can be wrapped around e.g. after (e);

(g) irrespective of whether or not (f) is used, the tube or strip is then appropriately placed and positioned, and on heating, it recovers its original shape, by way of contraction.

It can be seen that the steps outlined above do not include any separate making of a fabric, mesh or pleat by and in itself. Only during the step b there is made something akin to a mesh but that is being carried out and generated right then and there and as a part of the wrapping process and not as a separate item.

To spin or wrap around or braid around a configuration is known from cable engineering as well as from making hoses. The special wrapping of the strand or strands on the inner tube on the other hand is to be considered in conjunction with subsequent extruding of an outer tube thereupon a nearly homogeneous article wall is produced. It is believed that the resulting high tensile strength of that tube with triple layer integrated reinforcement is the result of internal boundary effects.

Each strand that is being used per step b, in particular each strand that is provided for obtaining a helical wrapping spinning, braiding or the like around the inner tube, is by itself comprised of a polymer core covered by at least one thread of a material that is to be regarded as nonstretchable such as a metal filament, glass, mineral, cotton, polyester, or aramide fiber.

The cross linking in accordance with step d above may include the polymer strand core and in general is of advantage in order to obtain high rates of shrinkage e.g. shrinkage, e.g. more than 100%. If only one of the tubes is cross linked then, but there is a good adhesion of the tubes in relation to each other and the shrinking is, so to speak, carried along. It is of advantage however in certain cases to cross link both tubes whereby it may be of advantage, and is supported as a refinement of the method, to have the outer tube somewhat less strongly or less extensively cross linked. By way of example the inner tube may have a degree of cross linking between 25 and 35% while the outer tube is cross linked only to the extent of 5 to 15%.

For the stretching and expansion operation one will preferably provide in the interior of the inner tube an excess pressure, and to radially force the compound tube against the inside of a (unexpandable) sizing tube into which the expanding tube has been inserted. Alternatively one may provide a low pressure between the space of the sizing tube and the inserted tube to be expanded; that low pressure will cause the inserted tube to radially expand and to abut the sizing tube. Essential is that the reinforcing strand and fabrics material will in fact participate actively in the expansion process without causing those threads which are not stretchable to tear. Owing to the particular shaping that is the helical configuration of the nonstretchable material wound upon a synthetic material core, the strand as a whole becomes stretchable.

The product made in accordance with the invention is in fact a tube that is heat recoverable or shrinkable while its wall includes a mesh, braid, plate, wrapping of strands, which in turn include a high strength cover. In accordance with a particular advantageous configuration of the invention (option (f) above) one can cut the tube as made longitudinally and obtain this way a stretchable or stretched band or strip. This way one has in fact available a thread reinforced strip without specific manufacture of the reinforcing webbing in the first place. The longitudinal cutting can be carried out before or after the expansion. In case there is a tube that is being cut longitudinally before the expansion, the resulting strip can be stretched in conventional stretching frame as it is commonly used for stretching of tapes or ribbon.

It is essential for the invention that the inner and outer tubes bond to each other intimately. For this it is necessary that during the extrusion of the outer tube the synthetic material that is in the molten state will in effect be welded to the synthetic material of the inner tube. This bond can be achieved by avoiding the formation of voids between the strands that have been wrapped around, spun around, braided around, pleated around etc. the inner tube. Of course, the wrapping inherently does produce certain gaps and spaces because the strands do not form a totally homogeneous layer. These gaps may to some extent be filled by the extrusion of the material that will then form the outer tube. But still, some voids are to be expected and in order to avoid them, the gaps are filled (prior to extrusion of the outer tube) with a synthetic powder whereby it is of course of advantage to use the same material for the powder as has been used for the inner and for the outer tube. Uniformity in the polymer and its powder to fill the gaps and voids makes sure that one obtains a very good bond under exclusion of air bubble inclusion.

As far as the wrapping of strands on the inner tube is concerned, it is of particular advantage to use at least two strands and to wrap them upon the inner synthetic tube with opposite pitch. Different pitch in the wrapping inherently provides a netlike internal reinforcing layer for the tubular configuration being made. In a particular practical way of practicing the invention the inner tube and the outer tube as well as the added synthetic powder is cross linked so that there is cross linking throughout. Here then it may be of advantage to use a peroxidic cross linking or any other chemically induced cross linking. Cross linking may obtain after all the configurations have been completed. In a refined manner it is possible to have the shrinking obtain concurrently with the extrusion of the outer tube. The degree of cross linking is responsible for the extent of shrinking.

Whenever the outer tube is extruded two or more radially outwardly extending bars may be included in integral configuration with the outer tube. On cutting the tube longitudinally, a strip obtains with bars along the longitudinal edges of the strip. Later such a strip is e.g. placed around a tubular object, and may be reconnected by clamping the bars together through a C-shaped closure.

Two aspects of refinement should be considered broadly. First, the compound tube as made with ridges or bars extending radially serves as an intermediate product. The strands with synthetic core and nonextensible, strength enhancing threads on them extend helically around the tube as made; and when the tube is cut, they form a pattern of intersecting threads basically extending transverse to the tubular (originally circular) and thus no length extension. The strands form a kind of criss-cross pattern. To establish further strength enhancement, non-stretchable threads are run longitudinally onto the inner tube, before the outer tube is extruded. This is beneficial in those cases in which the length extension of the tube is not the dimension used as being subject to the stretching!

The second refinement is somewhat related to the foregoing. In between two layers of helically wound strands of the synthetic core-plus-strong-wrapping variety, another layer of just strong nonextensible threads is placed. The pitch will be such that the strands of the first layer have one pitch, the nonextensible thread layer thereon will have an opposing pitch and the next layer, now again of the strands has the same pitch as the first one.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a cut open tube with peeled away layers, made in accordance with the preferred embodiment of the present invention, the view is a perspective one;

FIG. 1a illustrates a side view of a strand used in the assembly of FIG. 1;

FIG. 2 and 3 illustrate cross sections through different examples of tubes made in accordance with the invention to be longitudinally cut;

Proceeding now to the detailed description of the drawings, FIG. 1 illustrates synthetic tube I which is made of an inner synthetic material tube 2 and an outer synthetic material tube 3. The tubes 2 and 3 have become more or less integral through mutual bonding, and they embed in between them a reinforcing layer of several strands 4 which have been wrapped around the inner tube 2 with opposite pitch. The strands are (see FIG. 1a) basically comprised of a synthetic i.e. polymeric core material 4a upon which it has been helically wound a thread 4b that is not expandable at shrinking temperature and is made of a material such as cotton, glass or mineral fiber, or metal wire or filament, or a polyester, or aramide etc.

Figure 4:
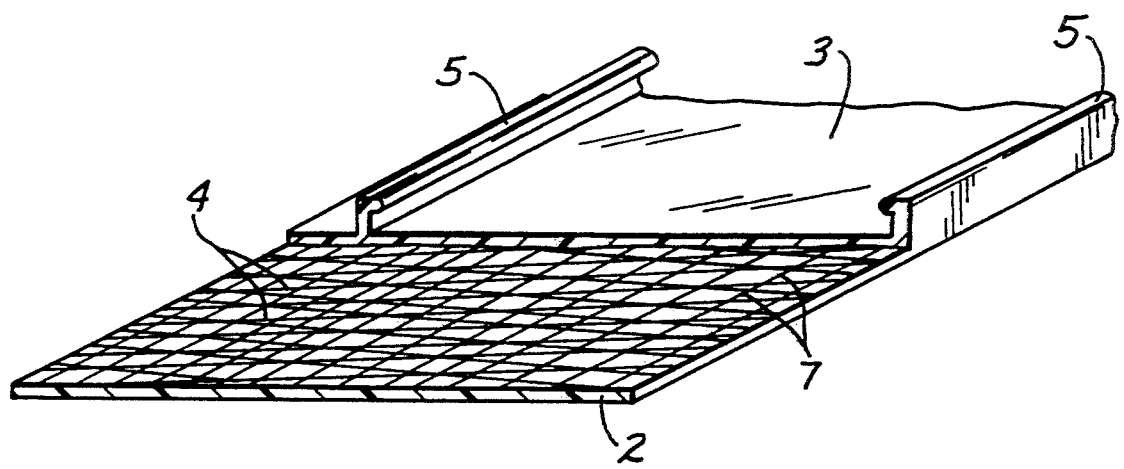
FIG. 4 illustrates a cut open tube of the kind made as per FIG. 2 and/or 3.

As is known from the older application of me and others there are these kinds of strands which are extensible even though there is a wrapping around the extensible core that is made of threads that are not extendible, but owing to helical fashion of wrapping the pitch length will in fact increase when the strand is extended, while the inner diameter of the hypothetical cylinder around which the helical thread extends is reduced. As the synthetic tube 1 is extended the wrapping consisting of the strands 4 is also extended. That however involves an extension of each strand 4 and particularly respective the core 4a follows that expansion directly. The threads 4b individually wrapped on the cover 4a follows that expansion in the helix and pitch expansion fashion outlined earlier. The inextensible thread portion 4b of each strand 4 throughout is responsible for obtaining an increased tear strength of the tube 1 as a whole. Here of course temperatures above 100° C. and below any decomposition temperature are of particular interest i.e. those temperatures for which the expansion and contraction (heat recovery) of the tube obtains.

The particular tube 1 as shown is very useful as a shrink hose. For this it is of advantage to cross link the inner tube 2 as well as the outer tube 3. In order to make sure that the initially separately made tubes 2 and 3 do combine with a good bond between them, it must be made sure that they must combine when they are both still in the thermoplastic state. The inner one may have solidified but a surface layer will re-melt on extrusion of the outer tube and bond thereon. The cross linking of any kind, either of one or the other or of both these tubes occurs subsequently. Of advantage here is a process of peroxide cross linking which obtains following the extrusion of the outer tube by way of further heating of the compound tubular arrangement as made.

Following the cross linking the compound tube 1 is expanded while still hot, e.g. under development of internal pressure as outlined above or by inserting tube 1 into a calibrating tube and reducing the pressure between the two tubes. The expanded state is maintained following cooling and therefore it remains permanent until the tube is reheated whereupon the expanded compound tube shrinks back (recovers) to its original dimension. The core 4a of the strands 4 may be of the thermosetting, heat recoverable variety. In this case it participates in the expansion-freezing heat recovering process. However, the primary purpose of these strands 4 is to serve as an expandable carrier for the strength enhancing threads 4b owing to the full embedment it is important only that these threads, made of glass, mineral, cotton, polyester etc. do not impede the extension process. On heat recovery, their carrying core may or may not actively participate in the contraction; the helical strength enhancing threads are very little affected at that point, but maintain effective throughout as guards against tearing etc.

As is shown specifically by way of example in FIGS. 2 or 3 one may extrude together with the other tube 3 and integrally therewith bars 5. This is particularly of advantage if a split sleeve (FIG. 2) or a double split sleeve (FIG. 3) is to be made, as shown configurationally e.g. as per the German patent 15 25 815. The completed tube 1 is then cut longitudinally between the bars 5 as shown by the line 6; once in FIG. 2 twice in FIG. 3. They are also cut transversely to obtain strip actions as long as needed, and short sleeves transversely to obtain strip actions are made that way.

The strands 4 run within that strip and at a particular angle in relation to the direction of stretching which is azimuthal or peripheral as far as the original tubular configuration is concerned. FIG. 4 illustrates such a strip made in accordance with the invention to be wrapped as a splicing sleeve around a tubular joint on a cable joint (double arrow A). In addition two strand patterns running essentially in direction of shrinking and stretching (arrow B). Another plurality of threads 7 runs in the longitudinal direction of the strip and of the tube as it originally was made, which is the same way of saying that these threads 7 run parallel to the bars 5.

The threads 7 may not be stretchable and are, therefore, made of a non-stretchable tensile strength enhancing material such as cotton, metal, glass fibers and so forth. A sleeve made from a strip as per FIG. 4 can then be placed around a tubular substrate such as a cable splice as shown and described in reference to German patent 15 25 815. A C-shaped bar is slipped over the adjoining bars 5 to close the newly formed sleeve along the longitudinal edges. That sleeve is then heated and shrinks.

Figure 5:
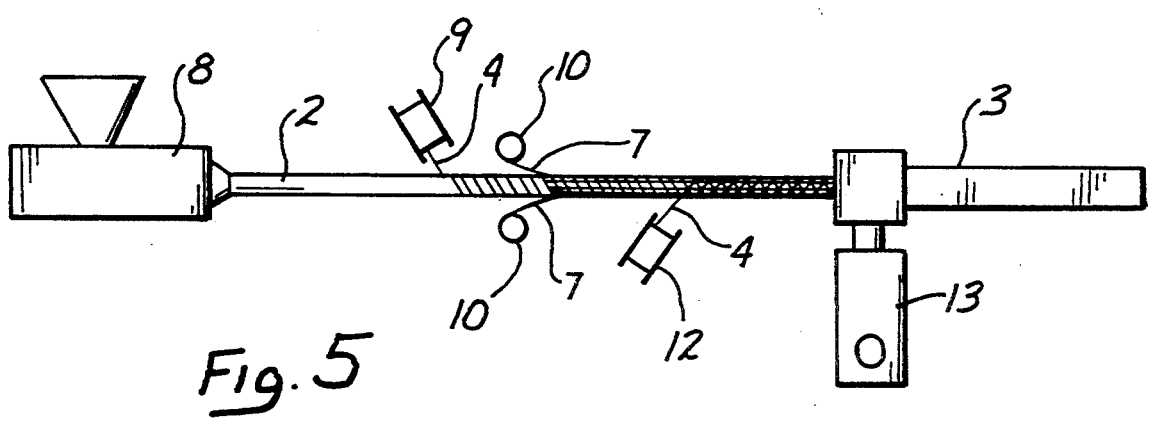
FIG. 5 is a side view in a somewhat schematic fashion illustrating the overall practicing of the preferred method of this invention in accordance with best mode considerations.

Turning now to FIG. 5 there is illustrated broadly the equipment for carrying out the method in accordance with the invention. One begins with extruding the inner tube 2 e.g. by means of extruder 8. The material that is being extruded is preferably peroxydically cross linkable polyethylene, but of course any cross linking does not take place at that point of extrusion of this tube 2 which will become the inner tube. The next step is to helically wrap stretchable strands 4 of the type described above (FIG. 1c) in the form of a layer. The strands 4 are drawn, pulled or otherwise taken from multiple spools 9, and in a spinning like fashion, to place them around the tube 2. For reasons of clarity of illustration only a single spool 9 is shown but there is a plurality of such spools. Corresponding to the numbers of strands to be wrapped.

In addition there is a plurality of spools 10, actually only two are shown but more can be provided. From these spools 10 glass threads 7 or threads of other strength enhancing, now heat recoverable material are taken and uniformly distributed above the periphery of the tube plus layer of strands 4 configuration. The pitch is opposite the one for the first layer of strands 4. Upon this particular layer another layer of stretchable strands 4 is helically wrapped but now with a pitch that may be as compared with the strands 4 for the original layer, oppositely oriented. The strands 4 of the outer layer are taken from supply spools 12 which run around the assembly only one of them is illustrated but there can be one or several more.

Please note that this is a general case of lengthwise (longitudinal) reinforcement and strength enhancement. The nonextensible threads 7 may actually be run longitudinally, that is with zero pitch, into an assembly. This is of course beneficial only when the heat recovery is in the radical/azimuthal direction and not spatially!. In either case, it is within the purview of assembly, to have first layer of strands 4 at a particular (possibly reverse) pitch; a layer of plural longitudinal nonextensible threads 7 and another layer Of strands 4, having pitch either equal to or opposite the first one!

A transverse extruder 13 now extrudes the outer synthetic tube 3 upon the previously made assembly. Preferably also this tube 3 may include or is actually made of polyethylene with peroxide included for subsequent cross linking of that nature. The gaps between the strands 4 and the threads 7 were filled, prior to the extrusion of the tube 3, with a fine grade polyethylene powder. The powder fills all interstices.

As the extrusion of the outer tube obtains the heat of the extrusion for the tube 3 melts the powder and also to some extent the outer layer of tube 2 underneath, and now an intimate bond obtains through welding as between inner tube 2, outer tube 3 and powder in between with strands 4, and threads 11 being firmly embedded in this mutual bond layer. Following the extrusion of outer tube 3 the completed tube 1 is heated up to the decomposition temperature of the peroxide which is the temperature needed to obtain cross linking. On continuing this heating inner tube 2, outer tube 3 and possibly the added powder are cross linked. The now completed cross linked hose will be expanded as was explained earlier in a manner that is known per se. The hose is then cooled in the expanded state and e.g. should be installed etc. and i.e. until heat shrinking is obtained to recover the original shape and diameter of the tube that was made and which basically is the diameter of the tube 1 prior to the expansion.

Alternatively the tube that has been made and cross linked is cut and the resulting ribbon or tape or strip is then stretched prior to expansion in the heated state and then cooled while being stretched to obtain a heat stretchable tape. This was described already with reference to FIGS. 2, 3 and 4.

It was found that articles made in accordance with the invention do have a considerably improved tear strength as compared with shrink article made of otherwise similarly cross linked polyethylene but without reinforcing insertion. The primary advantage is to be seen in that the meshlike reinforcing layer as such is also stretchable, and that is the result of forming that layer on an inner tube while embedding it into the overall tube wall through the subsequent extrusion of an outer tube. This then enables the production of a heat shrinkable tube or of an intermediate product strip from which sleeve forming portions can be cut, if stretched in a manner known otherwise.

The manufacture of tubes with a relatively large diameter it use with advantage on application of 4 in a stranding process (known per se) with reversing pitch within the same layer. In other words following threading and wrapping strand 4 helically around the inner tube for a while the pitch of the helices is reversed and threading continues in the reverse direction, again for a little bit, following which another reversal obtains and so forth. The second layer of threads should then match the reversal correspondingly so that everywhere the layers as they are superimposed have also radially opposite pitch. For proceeding in this fashion the supply spools for the strands 4 do not have to run around the tube but can, in fact, be taken up from stationary spools which in the equipment provides for some wrapping in helical direction reversal and so forth so that the supply can remain stationary which is a considerable facilitation as far as the equipment and manufacturing process is concerned.

The invention is not limited to the embodiments described above but all changes and modifications thereof, not constituting departures from the spirit and scope of the invention, are intended to be included.

I claim:

1. Method of making a shrink article, comprising the steps:

extruding a robe from a polymeric material;

wrapping on said robe a first layer of at least one strand in a helical pattern, the strand having a synthetic polymeric material core and a wrapping wrapped around the core by spinning or braiding of an essentially nonstretchable material such as metal, glass, mineral, cotton, polyester, polyaramide;

extruding a second polymeric tubular material on top of the first layer and the tube made as per the proceeding steps;

cross linking the material of at least one of the extruded tubes;

heating or maintaining a temperature above the crystalline melting point of the cross linked tube or tubes;

expanding the tubular assembly as a whole in the heated state; and cooling the material in the expanded state.

2. Method for making a shrink article comprising the steps:

extruding a tube from a polymeric material;

wrapping helically on said tube a first layer of at least one strand said strand having a synthetic polymeric material core and a wrapping wrapped around the core by spinning or braiding of an essentially nonstretchable material such as metal, glass, mineral, cotton, polyester, polyaramide;

extruding a second polymeric tubular material on top of the first layer and the tube made as per the proceeding steps;

cross linking the material of at least one of the extruded tubes; providing for a cutting of said tube in longitudinal direction to obtain at least one strip;

heating said tube prior to cutting, or said strip subsequent to cutting, to a temperature above the crystalline melting point of the tube that is being cross linked;

stretching the strip or the tube, said cutting being carried out before or after the stretching.

3. Method as in claim 1, including the step of filling, to some extent, any spacing between the strands with a synthetic powder prior to the second extrusion step.

4. Method as in claim 2, including the step of filling, to some extent, any spacing between the strands with a synthetic powder prior to the second extrusion step.

5. Method as in claim 1, said wrapping step including wrapping at least two strands in opposite pitch upon the extruded synthetic tube.

6. Method as in claim 2, said wrapping step including wrapping at least two strands in opposite pitch upon the extruded synthetic tube.

7. Method as in claim 2, including extruding at least one radially extending bar together with the extrusion of the outer tube.

8. Method as in claim 1, including the additional step of placing a thread or threads of an unstretchable material on the inner tube.

9. Method as in claim 2, including the additional step of placing a thread or threads of an unstretchable material thread around the inner tube.

10. Method as in claim 1, said wrapping being carried out with reversing pitch.

11. Method as in claim 2, said wrapping being carried out with reversing pitch.

12. Method as in claim 2, including the step of introducing a plurality of longitudinally axially extending nonextensible threads prior to the second extrusion step.

13. Method as in claim 6, longitudinally axially extending non extensible threads being introduced in between a formation of two layers of the strands at opposite pitch.

* * * * *